United States Patent
Akiu

(10) Patent No.: US 11,526,594 B2
(45) Date of Patent: Dec. 13, 2022

(54) AUTHENTICATION CONTROL DEVICE, AUTHENTICATION CONTROL METHOD, AND AUTHENTICATION METHOD

(71) Applicant: NEC Corporation, Tokyo (JP)

(72) Inventor: Takashi Akiu, Tokyo (JP)

(73) Assignee: NEC CORPORATION, Tokyo (JP)

(*) Notice: Subject to any disclaimer, the term of this patent is extended or adjusted under 35 U.S.C. 154(b) by 585 days.

(21) Appl. No.: 16/490,945

(22) PCT Filed: Mar. 15, 2018

(86) PCT No.: PCT/JP2018/010311
§ 371 (c)(1),
(2) Date: Sep. 4, 2019

(87) PCT Pub. No.: WO2018/173932
PCT Pub. Date: Sep. 27, 2018

(65) Prior Publication Data
US 2020/0019694 A1    Jan. 16, 2020

(30) Foreign Application Priority Data
Mar. 23, 2017 (JP) .............................. JP2017-056888

(51) Int. Cl.
*G06F 21/36* (2013.01)
*H04N 13/128* (2018.01)
(Continued)

(52) U.S. Cl.
CPC ............. *G06F 21/36* (2013.01); *G06F 3/0481* (2013.01); *H04N 13/128* (2018.05); *G06F 2221/2133* (2013.01); *H04N 2013/0081* (2013.01)

(58) Field of Classification Search
CPC .................. G06F 21/36; G06F 3/0481; G06F 2221/2133; H04N 13/128; H04N 2013/0081
See application file for complete search history.

(56) References Cited

U.S. PATENT DOCUMENTS

2009/0232351 A1* 9/2009 Kagitani .......... H04N 21/25875
382/100
2009/0313694 A1 12/2009 Mates
(Continued)

FOREIGN PATENT DOCUMENTS

| JP | 2008-262549 A | 10/2008 |
| JP | 2012-109960 A | 6/2012 |

(Continued)

OTHER PUBLICATIONS

International Search Report for PCT Application No. PCT/JP2018/010311, dated Jun. 19, 2018.
(Continued)

*Primary Examiner* — Tadesse Hailu
*Assistant Examiner* — Darrin Hope

(57) ABSTRACT

In one aspect, the provided is an authentication control device including: receiving means for receiving an input associated with at least one position among a plurality of positions that are included in an authentication image causing a viewer to perceive depth and are at different apparent depths; and determination means for determining, based on the input, whether or not the input is made by a human.

20 Claims, 9 Drawing Sheets

(51) Int. Cl.
*G06F 3/0481* (2022.01)
*H04N 13/00* (2018.01)

(56) References Cited

U.S. PATENT DOCUMENTS

| | | | |
|---|---|---|---|
| 2012/0291122 A1 | 11/2012 | Chow et al. | |
| 2014/0189798 A1 | 7/2014 | Grimaud | |
| 2015/0026068 A1* | 1/2015 | Nuzzi | G06F 21/31 |
| | | | 705/44 |
| 2016/0378968 A1 | 12/2016 | Baca et al. | |

FOREIGN PATENT DOCUMENTS

| | | |
|---|---|---|
| JP | 2012-155501 A | 8/2012 |
| JP | 2013-061971 A | 4/2013 |
| JP | 2014-130599 A | 7/2014 |

OTHER PUBLICATIONS

English translation of Written opinion for PCT Application No. PCT/JP2018/010311.

* cited by examiner

AUTHENTICATION CONTROL DEVICE, AUTHENTICATION CONTROL METHOD, AND AUTHENTICATION METHOD

This application is a National Stage Entry of PCT/JP2018/010311 filed on Mar. 15, 2018, which claims priority from Japanese Patent Application 2017-056888 filed on Mar. 23, 2017, the contents of all of which are incorporated herein by reference, in their entirety.

TECHNICAL FIELD

The present disclosure relates to an authentication control device and the like.

BACKGROUND ART

There are various techniques for so-called user authentication (for example, see PTL 1 to PTL 3). Authentication techniques include a technique for determining whether or not a request for access is made by a human, as described in PTL 2 and PTL 3. An example of such a technique is a Completely Automated Public Turing test to tell Computers and Humans Apart (CAPTCHA).

CITATION LIST

Patent Literature

[PTL 1] Japanese Unexamined Patent Application Publication No. 2012-155501 A
[PTL 2] Japanese Unexamined Patent Application Publication No. 2013-061971 A
[PTL 3] Japanese Unexamined Patent Application Publication No. 2014-130599 A

SUMMARY OF INVENTION

Technical Problem

In a CAPTCHA, a character sequence is distorted or processed in such a manner as to be unrecognizable by machines. It is necessary, however, to make a character sequence even more difficult to recognize in order to cope with increasing precision in character recognition by machines. However, a character sequence that is too difficult to be recognized would also be too difficult for recognition by a human and may obstruct legitimate uses by a user or impair convenience of a user.

An example objective of the present disclosure is to provide an authentication technique for achieving both ease of use by a human and a high accuracy in distinguishing inputs by a human.

Solution to Problem

In one aspect, the provided is an authentication control device including: receiving means for receiving an input associated with at least one position among a plurality of positions that are included in an authentication image causing a viewer to perceive depth and are at different apparent depths; and determination means for determining, based on the input, whether or not the input is made by a human.

In another aspect, the provided is an authentication control method including: receiving an input associated with at least one position among a plurality of positions that are included in an authentication image causing a viewer to perceive depth and are at different apparent depths; and determining, based on the input, whether or not the input is made by a human.

In yet another aspect, the provided is an authentication method including: displaying an authentication image causing a viewer to perceive depth; receiving an input associated with at least one position among a plurality of positions that are included in the authentication image and that are at different depths; and determining, based on the input, whether or not the input is made by a human.

In yet another aspect, a program causing a computer to execute: receiving processing of receiving an input associated with at least one position among a plurality of positions that are included in an authentication image causing a viewer to perceive depth and are at different apparent depths; and determination processing of determining, based on the input, whether or not the input is made by a human. In yet another aspect, the provided may be a storage medium storing the above-described program.

Advantageous Effects of Invention

The present disclosure provides an authentication technique that achieves both ease of use by a human and a high accuracy in distinguishing inputs by a human.

EXAMPLE EMBODIMENT

First Example Embodiment

Figure 1:
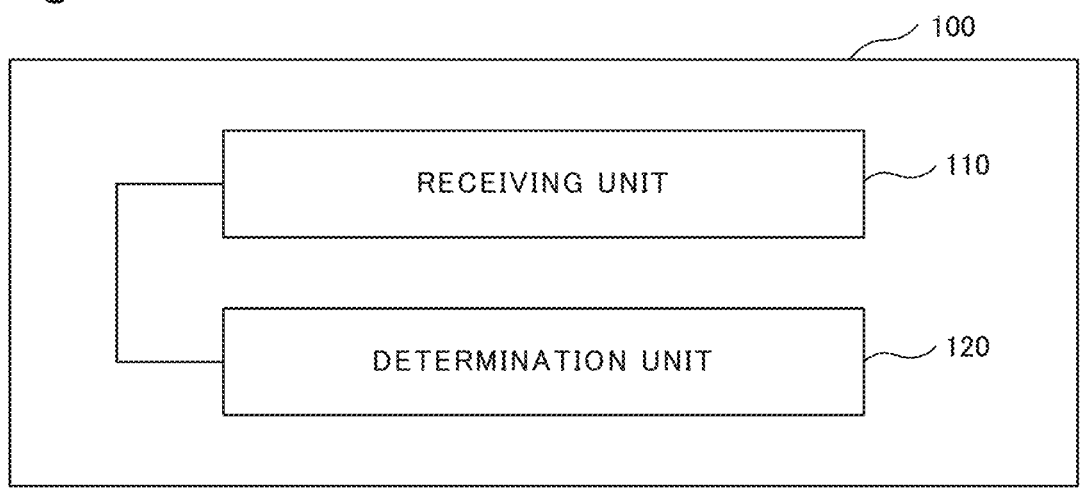
FIG. 1 is a block diagram illustrating an example configuration of an authentication control device.

FIG. 1 is a block diagram illustrating a configuration of an authentication control device 100 according to an example embodiment. The authentication control device 100 includes a receiving unit 110 and a determination unit 120. Note that the authentication control device 100 may include other components as necessary.

Authentication herein means to check the validity of an object. In an aspect, it can be said that the validity in the present example embodiment means that the respondent (in other words, the subject of an input) is not a computer but a human. According to this aspect, it can be said that the authentication control device 100 is a computer device for determining whether or not an input is made by a human. Note that the authentication control device 100 determines that an input is invalid when the input includes an error even if the input is made by a human.

An input device does not need to be integrated into the authentication control device 100. The authentication control device 100 may be configured to execute, together with the above-described authentication based on the subject of an input, authentication of another type (for example, authentication by password) according to known techniques.

The receiving unit 110 receives an input by a respondent. A respondent herein may be a human or a computer such as a robot. For example, the receiving unit 110 receives an input via an input device such as a keyboard and a mouse. In the present example embodiment, the receiving unit 110 receives an input based on an authentication image.

An authentication image is an image used for authentication. An authentication image herein includes an image that causes the viewer to perceive depth. In other words, an authentication image can be described as an image generating a sense of depth and an image generating a sense of perspective. An authentication image may be a so-called natural image (e.g. a photograph) taken by a digital camera or the like, or may be or a graphic image (e.g. a line drawing and a computer graphics image) generated by using drawing software.

The receiving unit 110 receives an input associated with at least one position of a plurality of positions included in an authentication image. In some instances this input represents a designated position itself in the authentication image. Alternatively, this input may represent a character or a plurality of characters (referred to also as "character sequence" hereinafter) displayed on a designated position or designated positions in the authentication image.

A character and a plurality of characters herein may be any of characters and symbols that can be input via an input device. In other words, a character that may be input in the present example embodiment are not limited to a character in the narrow sense of the word, such as an alphabetic letter. For example, a character herein may be a symbol that can be expressed by using a certain character encoding scheme such as the American Standard Code for Information Interchange (ASCII). Note, however, that characters that can be misread or input erroneously, such as those similar to other characters, may be excluded from the characters for the input.

The determination unit 120 determines whether or not the input received by the receiving unit 110 is valid. In other words, the determination unit 120 determines whether or not the input received by the receiving unit 110 is made by a human. The determination unit 120 executes this determination on the basis of the input received by the receiving unit 110. More specifically, the determination unit 120 determining whether or not the input satisfies a designated condition, and thereby determines the validity of an input received by the receiving unit 110.

The designated condition herein is predetermined on the basis of the authentication image. For example, the determination unit 120 may determine that an input received by the receiving unit 110 is valid when the input is an input representing a designated position in the authentication image. Alternatively, the determination unit 120 may determine that an input received by the receiving unit 110 is valid when the input indicates a character sequence consisting of characters displayed at designated positions in the authentication image.

Figure 2:
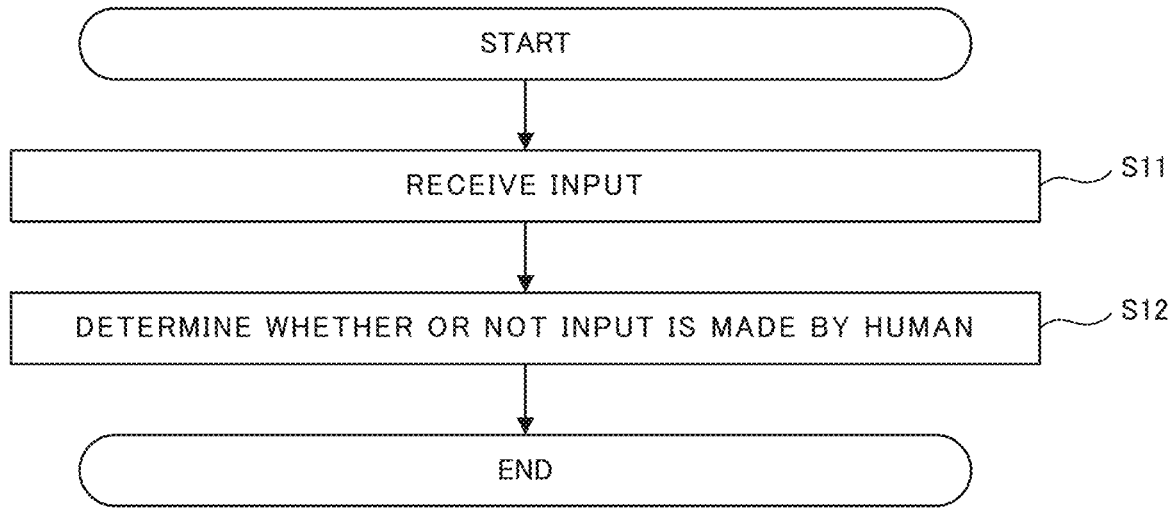
FIG. 2 is a flow chart illustrating an example operation of the authentication control device.

FIG. 2 is a flow chart illustrating an operation of the authentication control device 100. At Step S11, the receiving unit 110 receives an input made in response to an authentication image. On the basis of the input received at Step S11, the determination unit 120 determines at Step S12 whether or not the input is made by a human. In other words, the determination unit 120 determines whether the respondent to the authentication by means of the authentication image is a human or a computer. More specifically, the determination unit 120 determines whether or not the apparent depth that is indicated by the input is the designated depth, and thereby determines whether or not the input received at Step S11 is made by a human.

Figure 3:
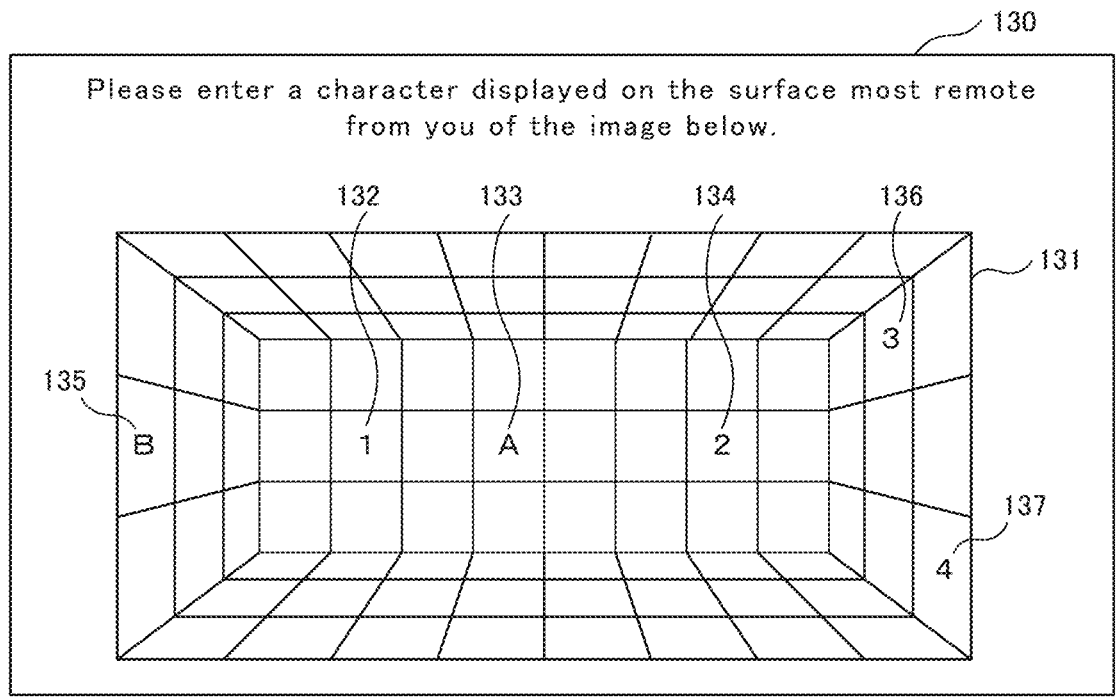
FIG. 3 illustrates an example of an authentication image.

FIG. 3 illustrates an example of an authentication image. In this example, the authentication image 130 includes an image 131, which imitates the inside of a box having a rectangular base (i.e. one surface) and sides (i.e. four surfaces) perpendicular to the base and respectively extending from the sides of the base, and characters 132 to 137 displayed in superposition on the image 131. In this example, the base part of the image 131 is perceived to be more remote from the viewer than the side parts.

The characters 132 to 137 are displayed at positions on the base part or the side parts of the image 131. Note that some of the characters 132 to 137 are displayed at positions (i.e. display positions) at different apparent depths. Specifically, the characters 132, 133, 134 are displayed on the base part while the characters 135, 136, 137 are displayed on side parts. Not all the characters 132 to 137 need to be at apparent depths different from each other but some of the characters (for example, characters 132, 133, 134) may be at an identical apparent depth.

In the present example embodiment, authentication is executed as the respondent inputs a character displayed at a specific position in the authentication image 130. In the example illustrated in FIG. 3, the respondent is requested to input a character from among those displayed on the base part of the image 131, in other words, the characters 132, 133, 134. In this case, the respondent inputs at least one of the characters 132, 133, 134. The respondent may be requested to input the characters 132, 133, 134 in a designated order (for example, "1A2"). The determination unit 120 determines that the input is made by a human when the designated character sequence is input.

As described above, the authentication control device 100 according to the present example embodiment is configured to determine whether or not an input is made by a human by using an authentication image that causes the viewer (in other words, a human) to perceive depth. In other words, it can also be said that the authentication control device 100 determines whether or not the input is made by a human by exploiting human faculty of perception.

Humans perceive depths of objects by using various clues such as binocular parallax. When a human looks at an image exploiting human faculty of depth perception such as a drawing and a figure drawn in perspective, the human perceives as if the image had depth even though the image is planer. Such a faculty of perception is a faculty of perception unique to humans and not possessed by machines.

When a human looks at, for example, the authentication image 130, the human easily identifies the part (the base part) in which the "remote surface" is positioned, on the basis of human faculty of depth perception. In contrast, machines usually fail to recognize the part in which the "remote surface" of the authentication image 130 is positioned. Thus, it is possible to easily determine whether a respondent is a human or a machine by requesting the respondent to make an input that depends on depth perception by using such an authentication image. This is because making such an input is easy for a human but not easy for a machine.

Thus, the present example embodiment has an advantageous effect of achieving both ease of use by a human and a high accuracy in distinguishing inputs by humans.

Second Example Embodiment

Figure 4:
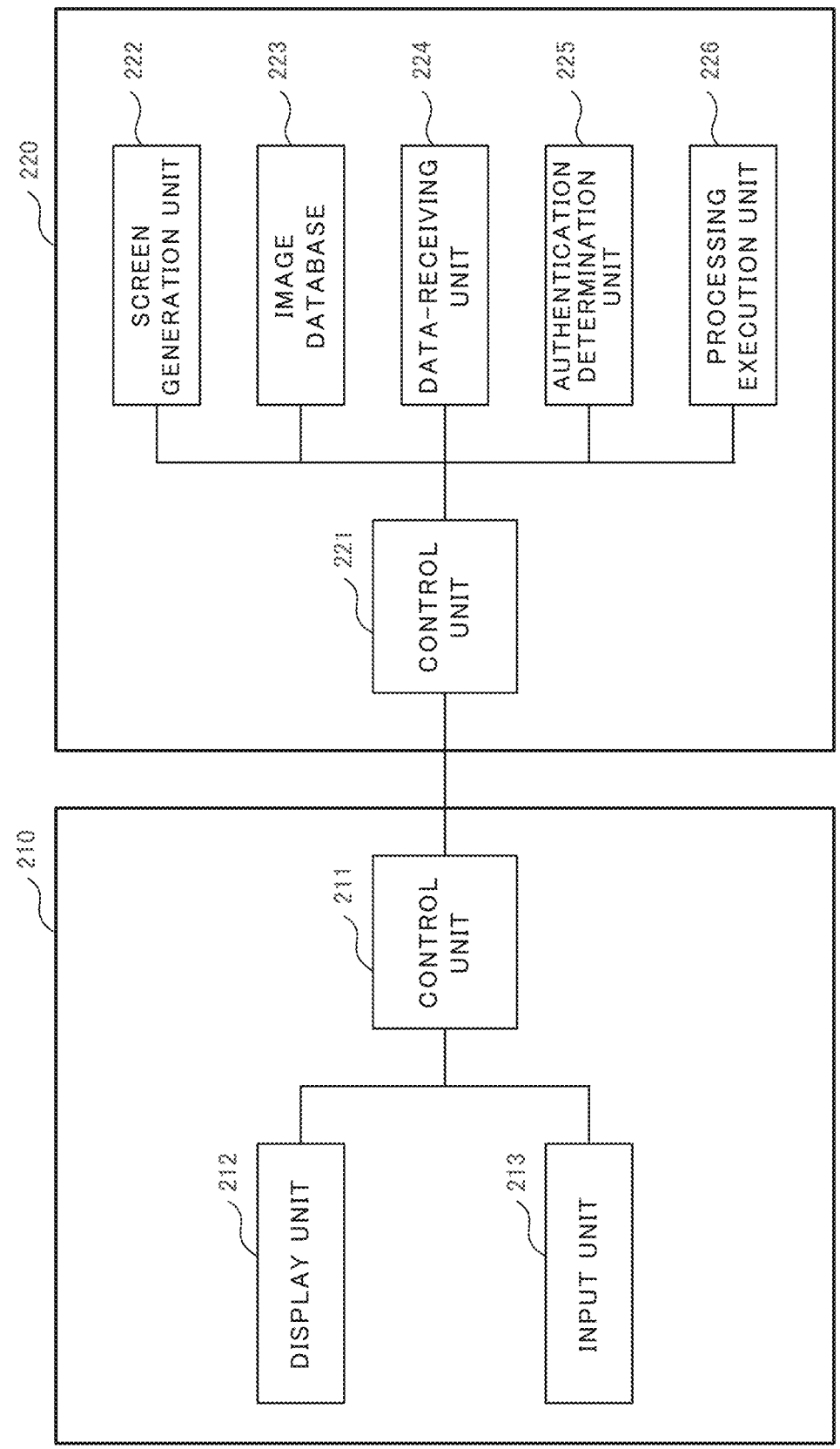
FIG. 4 is a block diagram illustrating an example configuration of an authentication system.

FIG. 4 is a block diagram illustrating a configuration of an authentication system 200 according to another example embodiment. The authentication system 200 includes a client device 210 and a server device 220. The client device 210 and the server device 220 are connected with each other via a network such as, for example, the Internet. The authentication system 200 may include a plurality of client devices 210.

The client device 210 is a computer device used by a user. The client device 210 may be a personal computer and may be a mobile communication terminal such as a smart phone. More specifically, the client device 210 includes a control unit 211, a display unit 212, and an input unit 213. The client device 210 may further include other components such as a microphone, a speaker, and a vibrator.

The control unit 211 controls the transfer of data between the client device 210 and the outside. The control unit 211 supplies data transmitted from the server device 220 to the display unit 212 or the input unit 213 and transmits data supplied from the input unit 213 to the server device 220.

The display unit 212 displays an image. The display unit 212 displays a designated screen including an authentication screen in accordance with the screen data supplied from the control unit 211. The display unit 212 changes display screens in response to an operation by the user. The authentication screen in the present example embodiment is an example of the authentication image in the first example embodiment.

The input unit 213 receives inputs by the user. The input unit 213 includes an input device such as, for example, a mouse and a keyboard. The input unit 213 may include a so-called touch screen display, in other words, an input device integrated into the display unit 212. An Input herein may be not only a manual input but also a voice input. The input unit 213 supplies data indicating an input by the user (referred to also as "input data") to the control unit 211.

The server device 220 authenticates the user and executes designated processing depending on the result of the authentication. The server device 220 corresponds to an example of the authentication control device 100 according to the first example embodiment. More specifically, the server device 220 includes a control unit 221, a screen generation unit 222, an image database 223, a data-receiving unit 224, an authentication determination unit 225, and a processing execution unit 226.

The control unit 221 controls the transfer of data between the server device 220 and the outside. For example, the control unit 221 supplies the input data transmitted from the client device 210 to the data-receiving unit 224. The control unit 221 transmits the screen data generated by the screen generation unit 222 to the client device 210.

The screen generation unit 222 generates screen data representing an authentication screen. The screen generation unit 222 generates screen data by using a base image stored in the image database 223. The screen generation unit 222 supplies the generated screen data to the control unit 221.

The image database 223 stores image data indicating a base image as a template. A base image herein is an image that is used as a base for an authentication screen. A plurality of kinds of base images are registered in the image database 223. The image database 223 supplies image data to the screen generation unit 222 when screen data representing an authentication screen are generated. The image database 223 may be implemented as a device separate from the server device 220.

The data-receiving unit 224 receives the input data supplied from the control unit 221. The data-receiving unit 224 supplies the input data input as a response to the authentication screen to the authentication determination unit 225. The data-receiving unit 224 is an example of the receiving unit 110 in the first example embodiment.

The authentication determination unit 225 executes user authentication on the basis of the input data supplied from the data-receiving unit 224. The user authentication in the present example embodiment includes determining whether or not the user, in other words, the sender of the input data is a human. Note that the user authentication in the present example embodiment may be combined with another type of authentication such as password authentication and biometric authentication.

The processing execution unit 226 executes processing depending on the result of the determination by the authentication determination unit 225. In some instances, the processing execution unit 226 executes processing for informing the client device 210 whether the user authentication has been successful or not. Alternatively, the processing execution unit 226 may execute a designated application program (e.g. so-called a Web application or the like) after user authentication and may inform another device of the result of the authentication.

The above-described is the configuration of the authentication system 200. The user uses a certain service by using the client device 210. When the service is to be used, the client device 210 requests an access to the service and transmits the input data responding to the authentication screen to the server device 220. The server device 220 executes the below-described processing interacting with the client device 210.

Figure 5:
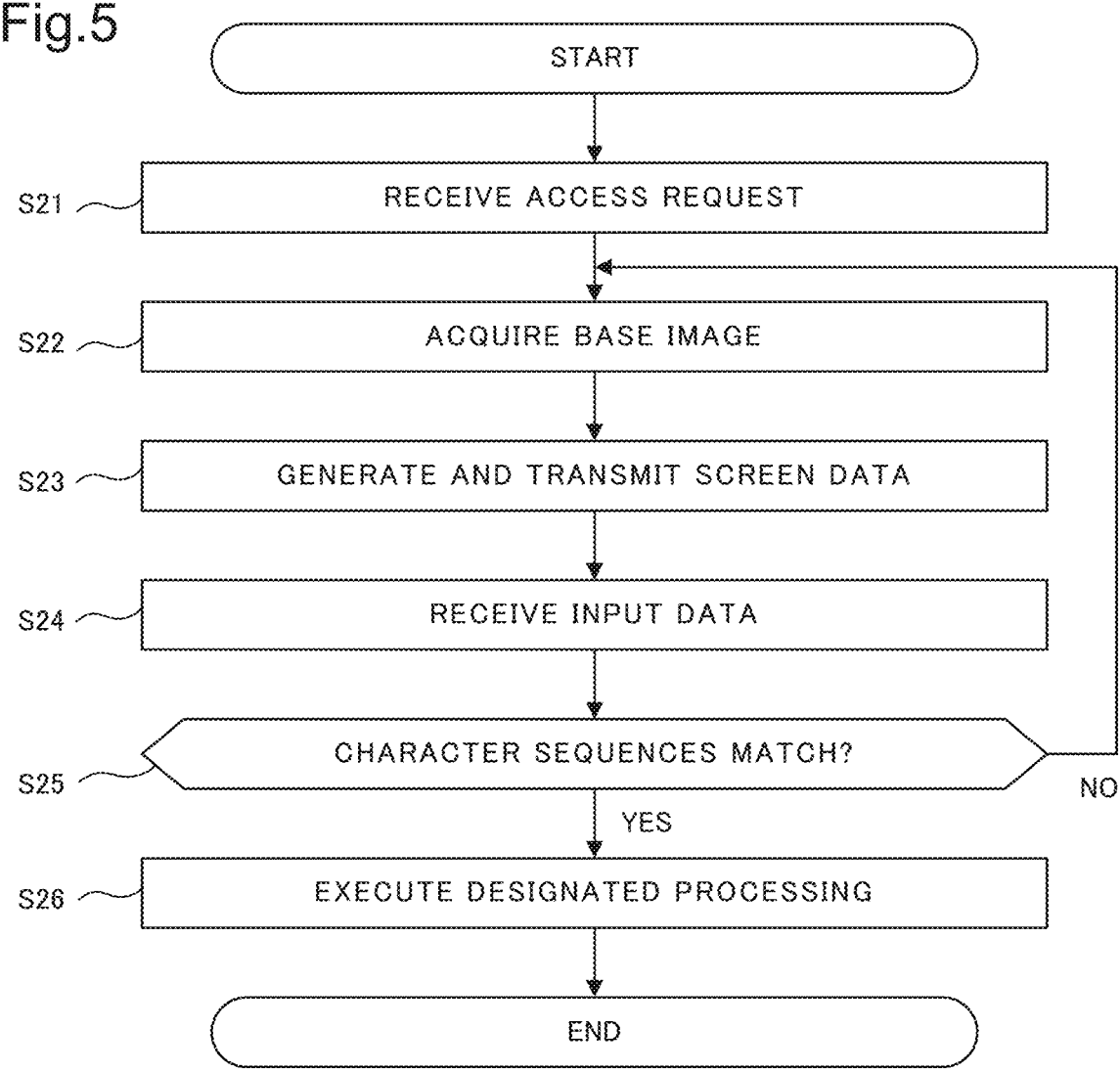
FIG. 5 is a flow chart illustrating an example operation of a server device.

FIG. 5 is a flow chart illustrating an operation of the server device 220. At Step S21, the data-receiving unit 224 receives an access request to the service. The client device 210 requests an access to the service when the client device 210 receives a designated operation from the user. A designated operation herein is, for example, an operation of staring a designated application program or an operation of accessing a resource identified by a designated Uniform Resource Locator (URL).

The screen generation unit 222 executes the processing of Steps S22 and S23 in response to the access request. At Step S22, the screen generation unit 222 acquires one of the plurality of base images stored in the image database 223. At Step S23, the screen generation unit 222 generates screen data representing an authentication screen on the basis of the base image acquired at Step S22. The control unit 221 transmits the screen data generated by the screen generation unit 222 to the client device 210.

Figure 6:
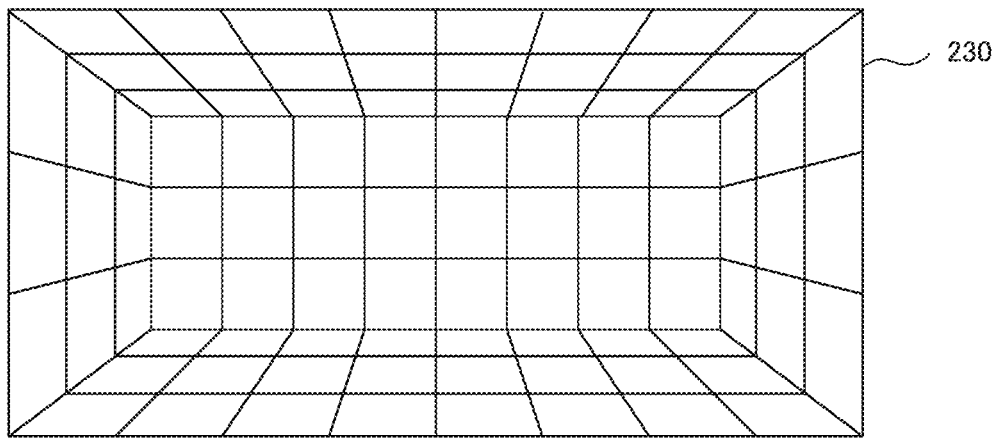
FIG. 6 illustrates an example of a base image.

FIG. 6 illustrates an example of a base image. The base image 230 is an image that causes the viewer to perceive depth. The base image 230 is, for example, an image corresponding to the authentication image 130 in FIG. 3 excluding the characters 132 to 137. The authentication screen includes an image including such a base image and a plurality of characters superposed thereon.

The characters superposed on a base image include a character sequence for authentication and a dummy character sequence. The character sequence for authentication is a character sequence regarded as a correct answer in the user authentication. The dummy character sequence, in contrast, is a character sequence regarded as a wrong answer in the user authentication. The user succeeds in the user authentication when the user inputs the character sequence for authentication whereas the user fails in the user authentication when the user inputs the dummy character.

The display positions for these character sequences may be designated on the base image in advance. More specifically, the display position of the character sequence for authentication and the display positon of the dummy character sequence may be designated on the base image. The display positons of the character sequences may vary for each base image. Note that the character sequence for authentication and the dummy character sequence do not need to be designated in advance but may vary each time (in other words, every time screen data are generated).

The base image may include coordinate information that indicates, in addition to the (two-dimensional) coordinates on a plane, the visual depth of each set of the coordinates. The coordinate information herein is information in a three-dimensional rectangular coordinates system in which, for example, the coordinates on the plane are represented by x-element and y-element and the depth is represented by z-element. This enables the screen generation unit 222 to recognize depth on the base image.

The screen generation unit 222 may determine the sizes of the characters to be superposed on the base image randomly. The word "randomly" described herein is not limited to the sense of having no regularity at all. For example, the screen generation unit 222 may determine the sizes of the characters on the basis of pseudorandom numbers. Alternatively, the screen generation unit 222 may determine the sizes of the characters to be superposed on the base image in such a manner that the size of each character is not correlated to the depth at the display positon of the character. This makes it difficult to infer the depth at which a character is positioned on the basis of the size of the character.

Figure 7A:
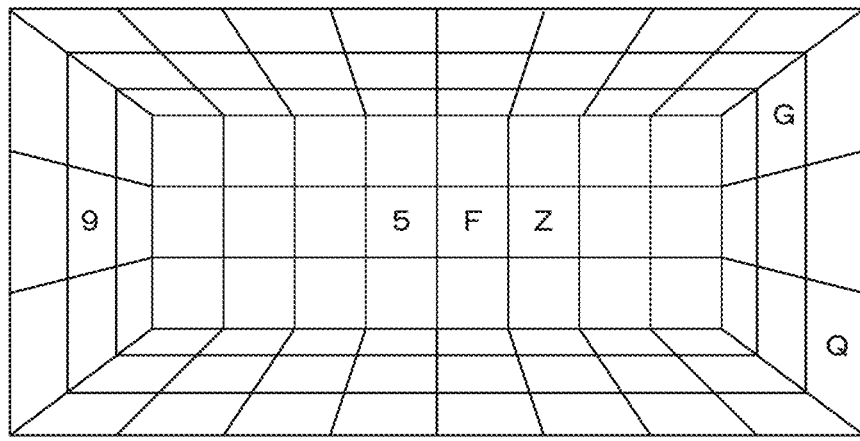
FIG. 7A illustrates an example of an authentication screen.
Figure 7B:
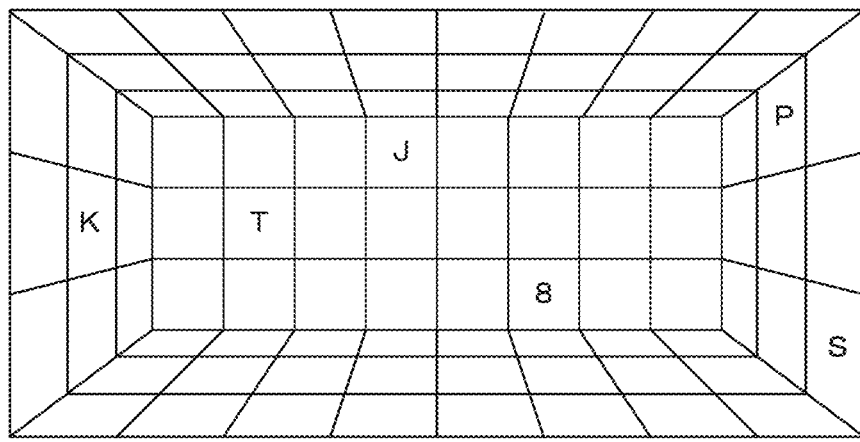
FIG. 7B illustrates another example of the authentication screen.

FIGS. 7A and 7B illustrate examples of authentication screens displayed on the basis of the base image 230 in FIG. 6. On the authentication screen 241 illustrated in FIG. 7A, the character sequence for authentication is "5FZ". In this example, the dummy character sequences are "9", "G", and "Q". In contrast, the character sequence for authentication on the authentication screen 242 illustrated in FIG. 7B is "S".

Those character sequences for authentication are designated on the basis of questions, in other words, input rules displayed on the authentication screen 241 and the authentication screen 242. For example, in the example in FIG. 7A, the user is requested to input the character sequence most remotely displayed on the base image 230. In contrast, in the example in FIG. 7B, the user is requested to input the character sequence most closely displayed. These input rules may be determined in advance but may also be determined by the screen generation unit 222 (in other words, the rules may be variable).

Upon receiving the screen data representing the authentication screen from the server device 220, the client device 210 displays the authentication screen. By displaying the authentication screen, the client device 210 prompts the user to input the character sequence for authentication. Upon receiving an input responding to the authentication screen, the client device 210 transmits the input data representing the input to the server device 220.

At Step S24, the data-receiving unit 224 receives the input data transmitted as a response to the authentication screen by the client device 210. When the user inputs the appropriate character sequence, the input data represent the character sequence for authentication. At Step S25, the authentication determination unit 225 executes user authentication based on the input data received at Step S24. More specifically, the authentication determination unit 225 determines whether or not the character sequence represented by the input data received at Step S24 matches the designated character sequence represented by the authentication screen.

When these character sequences match each other (S25: YES), in other words, when the user authentication is successful, the processing execution unit 226 executes Step S26. When these character sequences do not match each other (S25: NO), in other words, the user authentication fails, the screen generation unit 222 executes Steps S22 and S23 and generates screen data again. The screen generation unit 222 may use a base image different from the base image previously used and may change the character sequence for authentication without changing the base image.

At Step S26, the processing execution unit 226 executes designated processing. At this time, the processing execution unit 226 may inform the client device 210 that the user authentication has been successful. Alternatively, the processing execution unit 226 may execute the processing for executing the service requested by the client device 210. The client device 210 may inform the user of the success or failure of the user authentication by sound or vibration.

As described above, the authentication system 200 of the present example embodiment is configured to determine whether an input is done by a human, by using an authentication screen that causes a viewer to perceive depth. In other words, the authentication system 200 has a configuration common to the authentication control device 100 according to the first example embodiment. Therefore, the authentication system 200 presents advantageous effects similar to the advantageous effects of the authentication control device 100.

The authentication system 200 is configured to execute the user authentication by using an authentication screen in which a plurality of characters are superposed on a base image. This configuration allows an authentication screen to be generated by combining an image and characters. Thus, this configuration enables a large number of authentication screens to be generated more easily, compared with, for example, the generation of authentication screens using CAPTCHA. Further, CAPTCHA requires distorting characters, whereas this configuration does not require distorting characters.

Modification Examples

The above-described first and second example embodiments may be modification as described below. These modification examples may be combined appropriately as necessary.

Figure 8:
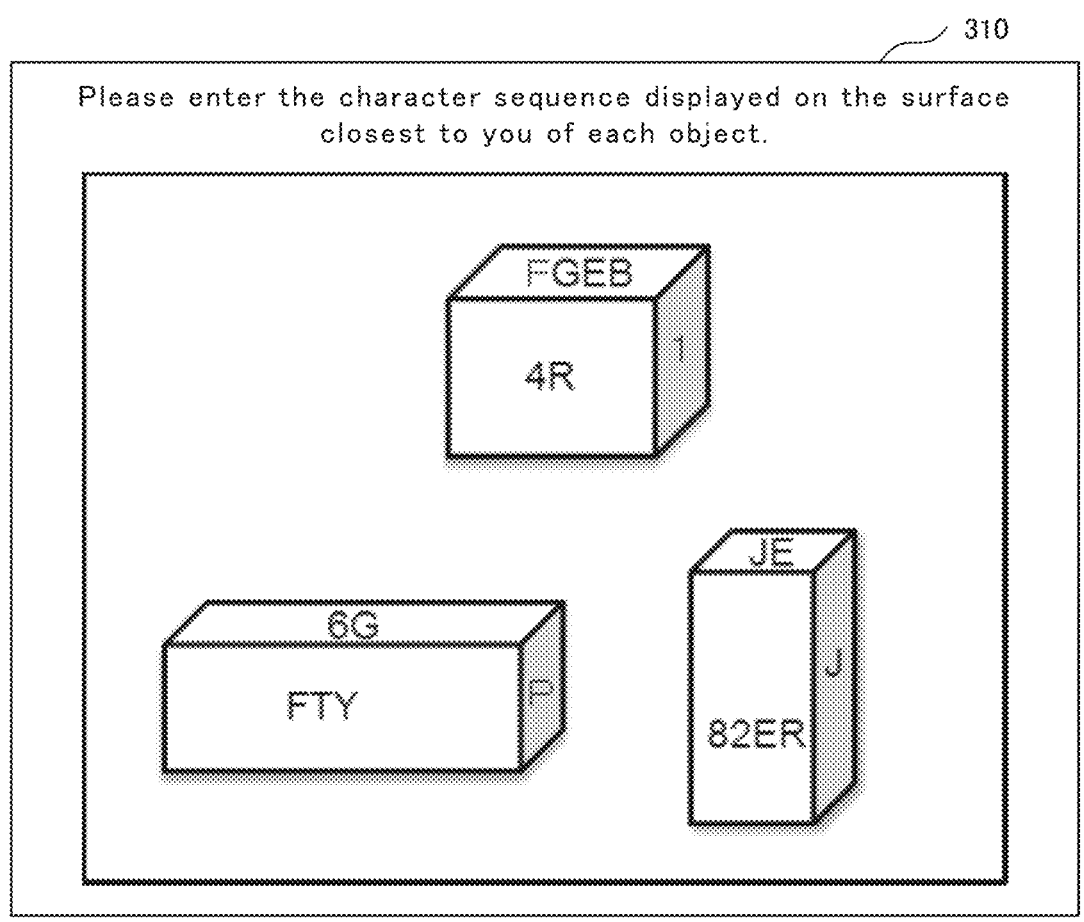
FIG. 8 illustrates yet another example of the authentication screen.
Figure 9:
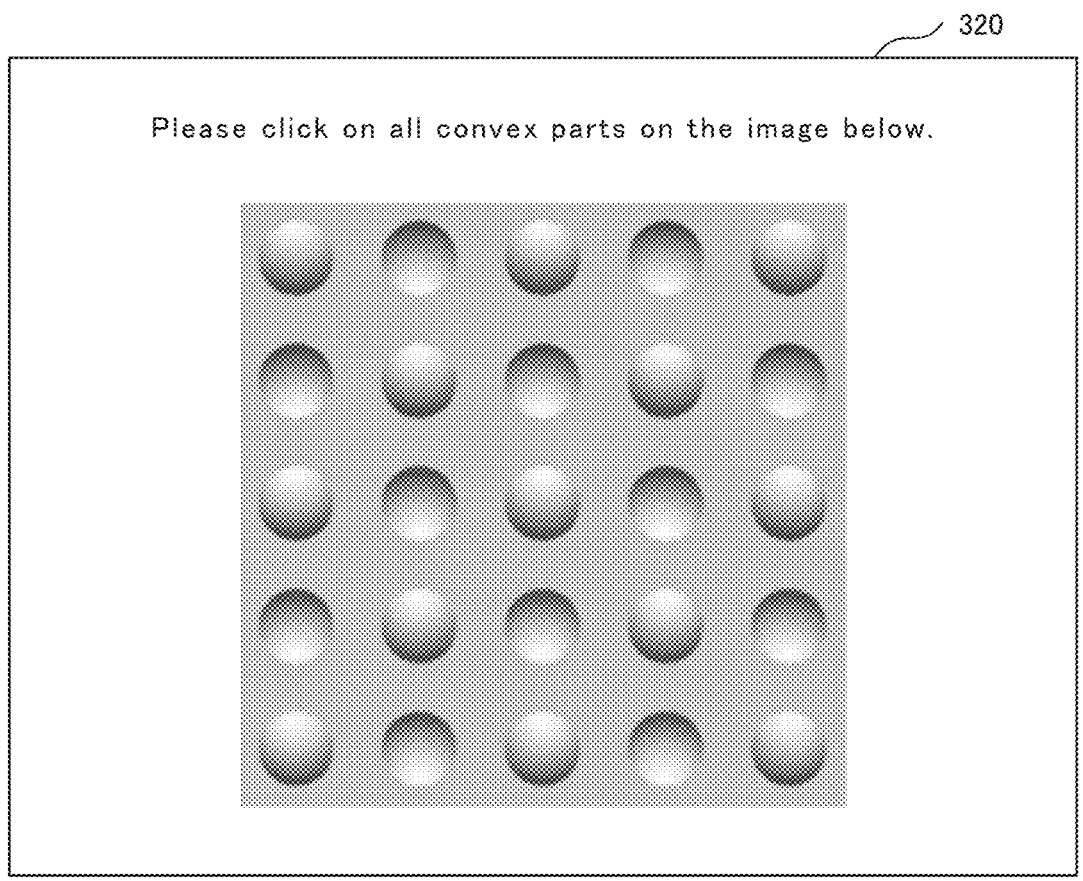
FIG. 9 illustrates still yet another example of the authentication screen.
Figure 10:
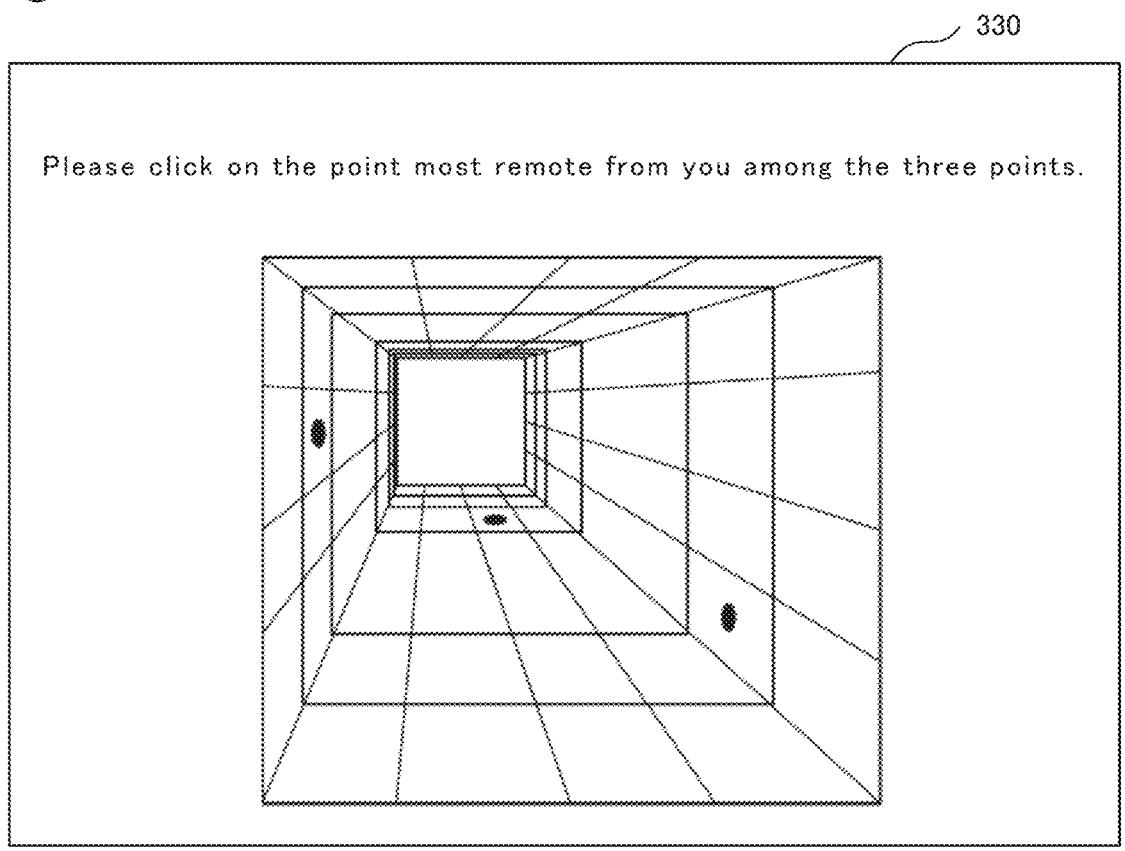
FIG. 10 illustrates still yet another example of the authentication screen.

(1) FIGS. 8 to 10 illustrate other examples of authentication screens. The authentication screen 310 in FIG. 8 displays polyhedra (e.g. rectangular parallelepipeds, as depicted herein) and includes an authentication image prompting to input character sequences displayed on designated sides of the polyhedra. In this example, the character sequences for authentication are "FTY", "4R", and "82ER". The authentication screen may display one polyhedron.

The authentication screen 320 in FIG. 9 depicts concavity and convexity by using shadow and includes an authentication image prompting to perform selection of designated regions (e.g. the parts perceived to be closer, as depicted herein) on the basis of the convexity and concavity. The selection here may be carried out by an operation of clicking with a mouse or an operation of tapping on a touch screen display.

The authentication screen 330 in FIG. 10 displays points (e.g. black dots herein) at a plurality of positions at different apparent depths and includes an authentication image prompting to perform selection of a designated point (e.g. the point perceived to be most remote, as depicted herein) from among the plurality of points. As illustrated by the examples in FIGS. 9 and 10, it is not necessary for the authentication image to include any character. This allows user authentication not dependent on the ability to recognize characters.

(2) In terms of concrete hardware configuration, the devices according to the present disclosure (i.e. the authentication control device 100 and the server device 220) can be achieved in a wide variety of ways not limited to a certain configuration. For example, the devices according to the present disclosure may be achieved by using software and may be achieved by using a plurality of hardware components, each executing processes assigned thereto.

Figure 11:
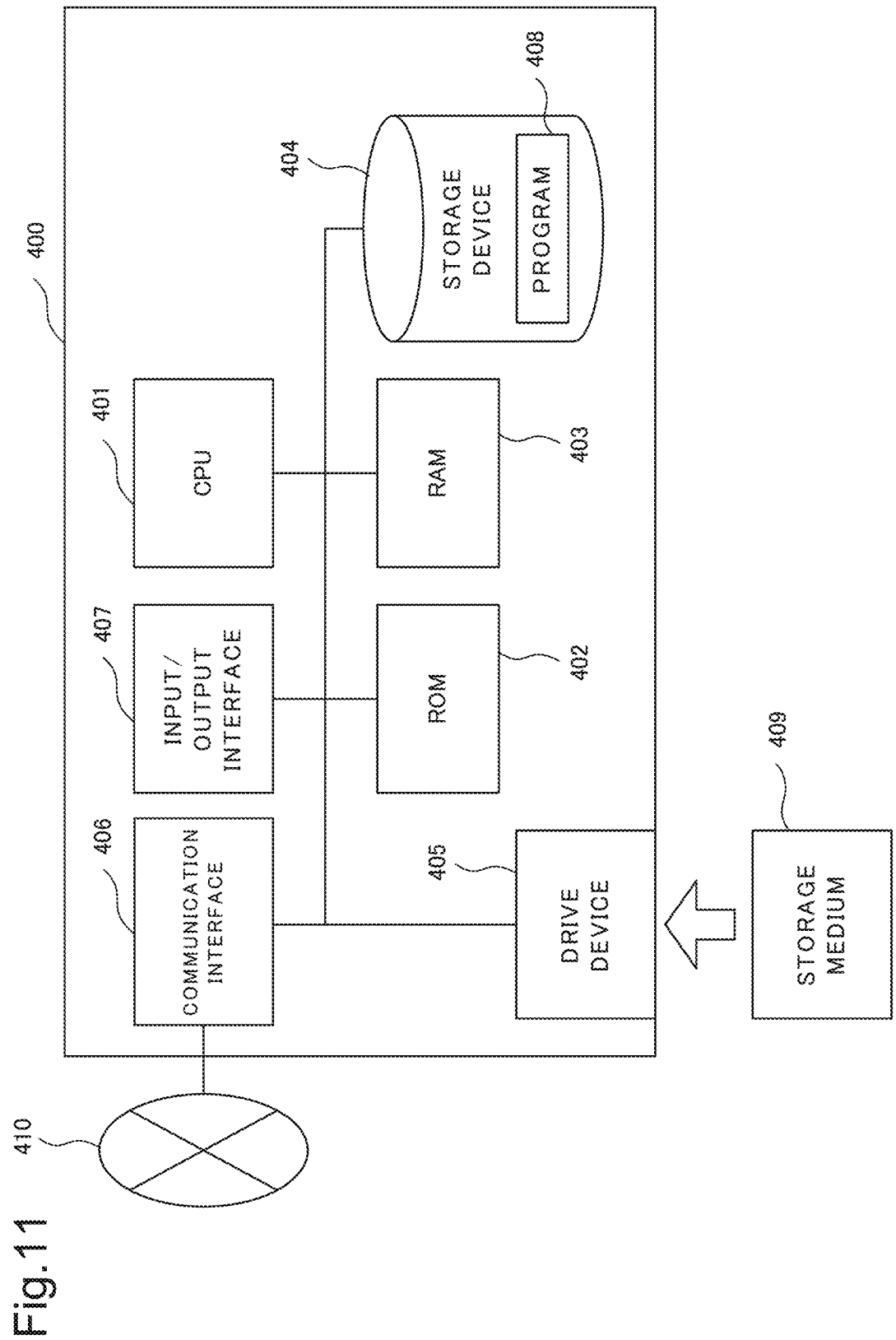
FIG. 11 is a block diagram illustrating an example hardware configuration of a computer device.

FIG. 11 is a block diagram illustrating an example hardware configuration of a computer device 400 for achieving a device according to the present disclosure. The computer device 400 includes a central processing unit (CPU) 401, a read only memory (ROM) 402, a random access memory (RAM) 403, a storage device 404, a drive device 405, a communication interface 406, and an input/output interface 407.

The CPU 401 executes a program 408 by using the RAM 403. The communication interface 406 transfers data to and from an external device via a network 410. The input/output interface 407 transfers data to and from peripheral equipment (e.g. an input device, a display device, and the like). The communication interface 406 and the input/output interface 407 may function as components for acquiring or outputting data.

The program 408 may be stored in the ROM 402. The program 408 may be stored in a storage medium 409 such as a memory card and read out by the drive device 405 or may be transmitted from an external device via the network 410.

A device according to the present disclosure may be achieved in the configuration (or part thereof) illustrated in FIG. 11. In the case of the authentication control device 100, for example, the receiving unit 110 and the determination unit 120 correspond to the CPU 401, the ROM 402, and the RAM 403. In the case of the server device 220, the control unit 221, the screen generation unit 222, the data-receiving unit 224, the authentication determination unit 225, and the processing execution unit 226 correspond to the CPU 401, the ROM 402, the RAM 403, and the communication interface 406. The image database 223 corresponds to the ROM 402, the drive device 405, or the communication interface 406.

The components of a device according to the present disclosure may be implemented as a single circuit (e.g. a processor or the like) or may be implemented as a combination of a plurality of circuits. The circuitry herein may be for a dedicated use or for a general purpose. For example, a part of a device according to the present disclosure may be achieved by a dedicated processor while the other part thereof may be achieved by a general-purpose processor.

(3) The present invention has been described above with the above-described example embodiments and modification examples as exemplary examples. However, the present invention is not limited to these example embodiments and modification examples. The present invention can encompass any example embodiment that may be achieved by applying variations and application understandable to a person skilled in the art in the scope of the present invention. The present invention can include any example embodiment that may be achieved by a combining or substituting matters described in the present description appropriately or as necessary. For example, a matter described in a certain example embodiment can be applied to other example embodiments so long as the application is not incompatible.

The above-described example embodiments may also be partly or entirely described as in the following supplementary notes without being limited thereto.

(Supplementary Note 1)

An authentication control device including:

receiving means for receiving an input associated with at least one position among a plurality of positions that are included in an authentication image causing a viewer to perceive depth and are at different apparent depths; and determination means for determining, based on the input, whether or not the input is made by a human.

(Supplementary Note 2)

The authentication control device according to Supplementary Note 1, wherein the determination means determines whether or not an apparent depth indicated by the input is a designated depth, thereby determining whether or not the input is made by a human.

(Supplementary Note 3)

The authentication control device according to Supplementary Note 1 or 2, further including generation means for generating, based on a base image causing a viewer to perceive depth and on a plurality of characters, the authentication image which displays, on each of the plurality of positions, one of the plurality of characters, wherein the receiving means receives the input indicating a character representing one of the at least one position, and wherein the determination means determines whether or not the character indicated by the input represents a designated position among the plurality of positions.

(Supplementary Note 4)

The authentication control device according to Supplementary Note 3, wherein the generation means randomly determines sizes of the plurality of characters displayed at the plurality of positions.

(Supplementary Note 5) The authentication control device according to Supplementary Note 3 or 4, wherein the sizes of the plurality of characters displayed at the plurality of positions in the authentication image are not correlated with depths of the plurality of positions.

(Supplementary Note 6)

The authentication control device according to any one of Supplementary Notes 3 to 5, wherein the generation means generates the authentication image in which a designated character and a dummy character are displayed at positions in the plurality of positions.

(Supplementary Note 7)

The authentication control device according to Supplementary Note 6, wherein the generation means generates the authentication image based on one of a plurality of base images, and a position at which the designated character is displayed, among the plurality of positions, is predetermined for each of the plurality of base images.

(Supplementary Note 8)

An authentication control method including:

receiving an input associated with at least one position among a plurality of positions that are included in an authentication image causing a viewer to perceive depth and are at different apparent depths; and determining, based on the input, whether or not the input is made by a human.

(Supplementary Note 9)

The authentication control method according to Supplementary Note 8, wherein the determining includes determining whether or not an apparent depth indicated by the input is a designated depth, thereby determining whether or not the input is made by a human.

(Supplementary Note 10)

The authentication control method according to Supplementary Note 8 or 9, further including generating, based on a base image causing a viewer to perceive depth and on a plurality of characters, the authentication image which displays, on each of the plurality of positions, one of the plurality of characters, wherein the receiving includes receiving the input indicating a character representing one of the at least one position, and wherein the determining includes determining whether or not the character indicated by the input represents a designated position among the plurality of positions.

(Supplementary Note 11)

The authentication control method according to Supplementary Note 10, wherein the generating includes randomly determining sizes of the plurality of characters displayed at the plurality of positions.

(Supplementary Note 12)

The authentication control method according to Supplementary Note 10 or 11, wherein the sizes of the plurality of characters displayed at the plurality of positions in the authentication image are not correlated with depths of the plurality of positions.

(Supplementary Note 13)

The authentication control method according to any one of Supplementary Notes 10 to 12, wherein the generating includes generating the authentication image in which a designated character and a dummy character are displayed at positions in the plurality of positions.

(Supplementary Note 14)

The authentication control method according to Supplementary Note 13, wherein the generating includes generating the authentication image based on one of a plurality of base images, and a position at which the designated character is displayed, among the plurality of positions, is predetermined for each of the plurality of base images.

(Supplementary Note 15)

An authentication method including:

displaying an authentication image causing a viewer to perceive depth;

receiving an input associated with at least one position among a plurality of positions that are included in the authentication image and that are at different depths; and determining, based on the input, whether or not the input is made by a human.

(Supplementary Note 16)

The authentication method according to Supplementary Note 15, wherein the determining includes determining whether or not an apparent depth indicated by the input is a designated depth, thereby determining whether or not the input is made by a human.

(Supplementary Note 17)

The authentication method according to Supplementary Note 15 or 16, further including generating, based on a base image causing a viewer to perceive depth and on a plurality of characters, the authentication image which displays, on each of the plurality of positions, one of the plurality of characters, wherein the receiving includes receiving the input indicating a character representing one of the at least one position, and wherein the determination includes determining whether or not the character indicated by the input represents a designated position among the plurality of positions.

(Supplementary Note 18)

The authentication method according to Supplementary Note 17, wherein the generating includes randomly determining sizes of the plurality of characters displayed at the plurality of positions.

(Supplementary Note 19)

The authentication method according to Supplementary Note 17 or 18, wherein the sizes of the plurality of characters displayed at the plurality of positions in the authentication image are not correlated with depths of the plurality of positions.

(Supplementary Note 20)

The authentication method according to any one of Supplementary Notes 17 to 19, wherein the generating includes generating the authentication image in which a designated character and a dummy character is displayed at positions in the plurality of positions.

(Supplementary Note 21)

The authentication method according to Supplementary Note 20, wherein the generating includes generating the authentication image based on one of a plurality of base images, and wherein a position at which the designated character is displayed, among the plurality of positions is predetermined for each of the plurality of base images.

(Supplementary Note 22)

A storage medium storing a program causing a computer to execute:

receiving processing of receiving an input associated with at least one position among a plurality of positions that are included in an authentication image causing a viewer to perceive depth and are at different apparent depths; and determination processing of determining, based on the input, whether or not the input is made by a human.

(Supplementary Note 23)

The storage medium according to Supplementary Note 22, wherein the determination processing determines whether or not an apparent depth indicated by the input is a designated depth, thereby determining whether or not the input is made by a human.

(Supplementary Note 24)

The storage medium according to Supplementary Note 22 or 23, the program further causing a computer to execute generation processing of generating, based on a base image causing a viewer to perceive depth and on a plurality of characters, the authentication image which displays, on each of the plurality of positions, one of the plurality of characters, wherein the receiving processing receives the input indicating a character representing one of the at least one position, and wherein the determination processing determines whether or not the character indicated by the input represents a designated position among the plurality of positions.

(Supplementary Note 25)

The storage medium according to Supplementary Note 24, wherein the generation processing randomly determines sizes of the plurality of characters displayed at the plurality of positions.

(Supplementary Note 26)

The storage medium according to Supplementary Note 24 or 25, wherein the sizes of the plurality of characters displayed at the plurality of positions in the authentication image are not correlated with depths of the plurality of positions.

(Supplementary Note 27)

The storage medium according to any one of Supplementary Notes 24 to 26, wherein the generation processing generates the authentication image in which a designated character and a dummy character are displayed at positions in the plurality of positions.

(Supplementary Note 28)

The storage medium according to Supplementary Note 27, wherein the generation processing generates the authentication image based on one of a plurality of base images, and a position at which the designated character is displayed, among the plurality of positions, is predetermined for each of the plurality of base images.

This application claims priority based on the Japanese Patent Application No. 2017-056888, filed on Mar. 23, 2017, the disclosure of which is incorporated herein in its entirety.

REFERENCE SIGNS LIST 100 authentication control device
110 receiving unit
120 determination unit
130 authentication image
131 image
132, 133, 134, 135, 136, 137 characters
200 authentication system
210 client device
211 control unit
212 display unit
213 input unit
220 server device
221 control unit
222 screen generation unit
223 image database
224 data-receiving unit
225 authentication determination unit
226 processing execution unit
230 base image
241, 242, 310, 320, 330 authentication screen
400 computer device
401 CPU
402 ROM
403 RAM
404 storage device
405 drive device
406 communication interface
407 input/output interface
408 program
409 storage medium
410 network

What is claimed is:

1. An authentication control device comprising:
at least one memory storing instructions; and
at least one processor configured to execute the instructions to:
receive an input associated with an authentication image that includes one base image causing a viewer to perceive a plurality of depths, a character for authentication on the base image, and a dummy character on the one base image, wherein an apparent depth of a position of the dummy character on the one base image is different from an apparent depth of a position of the character for authentication on the one base image; and
determine, based on the input, whether or not the input is made by a human.

2. The authentication control device according to claim 1, wherein
the at least one processor is further configured to
determine whether or not an apparent depth indicated by the input, other than the apparent depth of the position of the dummy character and the apparent depth of the position of the character for authentication, is a designated depth, thereby determining whether or not the input is made by a human.

3. The authentication control device according to claim 1, wherein
the at least one processor is further configured to:
receive the input indicating a character on the base image other than the character for authentication and the dummy character, the character having a position on the one base image-representing one of the at least one position; and
determine whether or not the position of the character indicated by the input is a designated position.

4. The authentication control device according to claim 3, wherein
the at least one processor is further configured to
determine sizes of the character for authentication and the dummy character on the base image.

5. The authentication control device according to claim 3, wherein
the sizes of the character for authentication and the dummy character on the base image are not correlated with the apparent depth of the position of the character for authentication and the apparent depth of the position of the dummy position, respectively.

6. The authentication control device according to claim 1, wherein
the at least one processor is further configured to
generate the base image of the authentication image in which the character for authentication and the dummy character are included.

7. The authentication control device according to claim 6, wherein
the at least one processor is further configured to
generate a plurality of other base images of the authentication image in addition to the one base image, and for each other base image, a position at which the character for authentication is on the other base image and a position at which the dummy character is on the other base image are predetermined.

8. An authentication control method comprising:
receiving an input associated with an authentication image that includes one base image causing a viewer to perceive a plurality of depths, a character for authentication on the base image, and a dummy character on the one base image, wherein an apparent depth of a position of the dummy character on the one base image is different from an apparent depth of a position of the character for authentication on the one base image; and
determining, based on the input, whether or not the input is made by a human.

9. The authentication control method according to claim 8, wherein
the determining includes determining whether or not an apparent depth indicated by the input, other than the apparent depth of the position of the dummy character and the apparent depth of the position of the character for authentication, is a designated depth, thereby determining whether or not the input is made by a human.

10. The authentication control method according to claim 8,
wherein the receiving includes receiving the input indicating a character on the base image other than the character for authentication and the dummy character, the character having a position on the one base image, and
wherein the determining includes determining whether or not the position of the character indicated by the input is a designated position.

11. The authentication control method according to claim 10, further comprising
determining sizes of the character for authentication and the dummy character on the base image.

12. The authentication control method according to claim 10, wherein
the sizes of the character for authentication and the dummy character on the base image are not correlated with the apparent depth of the position of the character for authentication and the apparent depth of the position of the dummy position, respectively.

13. The authentication control method according to claim 10, further comprising
generating the base image of the authentication image in which the character for authentication and the dummy character are included.

14. The authentication control method according to claim 13, further comprising
generating generating a plurality of other base images of the authentication image in addition to the one base image, wherein
for each other base image, a position at which the character for authentication is on the other base image and a position at which the dummy character is on the other base image are predetermined.

15. An authentication method comprising:
displaying an authentication image;
receiving an input associated with the authentication image that includes one base image causing a viewer to perceive a plurality of depths, a character for authentication on the base image, and a dummy character on the one base image, wherein an apparent depth of a position of the dummy character on the one base image is different from an apparent depth of a position of the character for authentication on the one base image; and
determining, based on the input, whether or not the input is made by a human.

16. The authentication method according to claim 15, wherein
the determining includes determining whether or not an apparent depth indicated by the input, other than the apparent depth of the position of the dummy character and the apparent depth of the position of the character for authentication, is a designated depth, thereby determining whether or not the input is made by a human.

17. The authentication method according to claim 15,
wherein the receiving includes receiving the input indicating a character on the base image other than the character for authentication and the dummy character, the character having a position on the one base image, and
wherein the determining includes determining whether or not the position of the character indicated by the input is a designated position.

18. The authentication method according to claim 17, further comprising
determining sizes of the character for authentication and the dummy character on the base image.

19. The authentication method according to claim 17, wherein
the sizes of the character for authentication and the dummy character on the base image are not correlated with the apparent depth of the position of the character for authentication and the apparent depth of the position of the dummy position, respectively.

20. The authentication method according to claim 17, further comprising
generating the base image of the authentication image in which the character for authentication and the dummy character are included.

* * * * *